United States Patent
Shaheen et al.

(10) Patent No.: US 7,218,626 B2
(45) Date of Patent: May 15, 2007

(54) SYSTEM AND METHOD FOR REDUCING INFORMATION COMMUNICATED BETWEEN UNIVERSAL MOBILE TELECOMMUNICATION SYSTEM MULTIMEDIA CAPABLE UNITS

(75) Inventors: Kamel M. Shaheen, King of Prussia, PA (US); Brian G. Kiernan, Voorhees, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1127 days.

(21) Appl. No.: 10/022,998

(22) Filed: Dec. 18, 2001

(65) Prior Publication Data

US 2002/0181424 A1 Dec. 5, 2002

Related U.S. Application Data

(60) Provisional application No. 60/294,192, filed on May 29, 2001.

(51) Int. Cl.
*H04Q 7/24* (2006.01)
*H04L 12/66* (2006.01)
*G06F 15/16* (2006.01)
*G06F 15/173* (2006.01)

(52) U.S. Cl. ............... 370/338; 370/349; 370/352; 370/401; 455/452.1; 709/226; 709/227

(58) Field of Classification Search ............... 370/338, 370/349, 352, 401; 455/452.1; 709/206, 709/207
See application file for complete search history.

(56) References Cited

U.S. PATENT DOCUMENTS

| | | | |
|---|---|---|---|
| 6,275,574 B1 | 8/2001 | Oran | |
| 6,366,577 B1* | 4/2002 | Donovan | 370/352 |
| 6,421,674 B1 | 7/2002 | Yoakum et al. | |
| 6,496,479 B1* | 12/2002 | Shionozaki | 370/230 |
| 6,910,074 B1* | 6/2005 | Amin et al. | 709/227 |
| 6,967,933 B2* | 11/2005 | Chapuran et al. | 370/271 |
| 7,106,718 B2* | 9/2006 | Oyama et al. | 370/340 |
| 2002/0165966 A1* | 11/2002 | Widegren et al. | 709/226 |
| 2004/0028037 A1* | 2/2004 | Rasanen et al. | 370/354 |
| 2004/0076145 A1* | 4/2004 | Kauhanen et al. | 370/352 |

* cited by examiner

*Primary Examiner*—Alpus H. Hsu
(74) *Attorney, Agent, or Firm*—Volpe and Koenig, P.C.

(57) ABSTRACT

Method and Apparatus for making more efficient use of air link resources and network capacity in a mobile telecommunications system in which unauthorized and/or unsupported media types transmitted in a session initialization protocol (SIP) message sent from one equipment user (UE) to another are deleted by the network(s) as the SIP message is routed through the system.

20 Claims, 8 Drawing Sheets

SIP INVITE  52

INVITE sip: +1-212-555-2222@home.net;.user=phone SIP/2.0
Via: SIP/2.0/UDP [5555::aaa:bbb:ccc:ddd]
Supported: 100rel
Remote-Party-ID: "John Doe" <tel:+1-222-555-1111>;privacy=off
Proxy-Require: privacy
Anonymity: Off
From: "Alien Blaster" <sip:B36(SHA-1(+1-212-555-1111; time=36123E5B;
seq=72))@localhost.;
    tag=171828
To: sip:B36 (SHA-1(+1-212-555-2222; time=36123E5B; seq=73))@localhost
Call-ID: B36 (SHA-1 (555-1111; time=36123E5B; seq=72))@localhost
Cseq: 127 INVITE
Contact: sip: [5555::aaa:bbb:ccc:ddd]
Content-Type: application/sdp
Content-length: (...)

HEADER v=0
o=- 2987933615 IN IP6 5555::aaa:bbb:ccc:ddd
s=-
c= IN IP6 5555::aaa:bbb:ccc:ddd
b=AS:64
t=907165275 0

GLOBAL m=audio 3456 RTP/AVP 97 96 0 15
a=rtpmap 97 AMR
a=fmtp 97 AMR
a=rtpmap 96 G726-32/8000
a=qos:mandatory sendrecv

AUDIO MEDIA 3 m=audio 3458 RTP/AVP 97 96 0 15
a=rtp 97 AMR
a=rtpmap 97 AMR
a=rmtp 97 mode-set=0,2,5,7: maxframes=2
a=rtpmap 96 G726-82/8000
a=qos:mandatory sendrecv

AUDIO MEDIA 4

FIG. 6

SESSION PROGRESS MESSAGE 72

SIP/2.0 183 Session Progress
Via: SIP/2.0/UDP scscf.home.net, SIP/2.0/UDP pcscf1.visited.net, SIP/2.0/UDP [5555::aaa:bbb:ccc:ddd]
Record-Route: sip:scscf2.home.net, sip:scscf.home.net
Remote-Party-ID: "John Smith" <tel:+1-222-555-2222>;privacy=off; screen=yes
Anonymity: Off
From:
To: sip:B36 (SHA-1(+1-212-555-1111; time=36123E5B; seq=73))@localhost; tag=314159
Call-ID:
Cseq:
Contact: sip: %5b5555%3a%3aeee%3afff%3aaaa%3abbb%5d@pcscf2.home.net
Rseq: 9021
Content-Dispostion: precondition
Content-Type: application/sdp
Content-length: (...)

HEADER v=0
o=- 2987933615 IN IP6 5555::aaa:bbb:ccc:ddd
s=-
c= IN IP6 5555::eee:fff:ggg:hhh
b=AS:64
t=907165275 0

GLOBAL m=audio 3456 RTP/AVP 97 96 0 15
a=rtpmap 97 AMR
a=fmtp 97 AMR
a=rtpmap 96 G726-32/8000
a=qos:mandatory sendrecv

AUDIO MEDIA 3

FIG. 7

SYSTEM AND METHOD FOR REDUCING INFORMATION COMMUNICATED BETWEEN UNIVERSAL MOBILE TELECOMMUNICATION SYSTEM MULTIMEDIA CAPABLE UNITS

This application claims priority to Provisional Patent Application No. 60/294,192, filed on May 29, 2001.

BACKGROUND

The present invention relates to wireless telecommunications. More specifically, the present invention relates to a technique for reducing unnecessary consumption of the air link resources and network capacity by reducing the size of transmitted messages.

The current third generation partnership project (3GPP) and internet engineering task force (IETF) session description protocol (SDP) protocol (RFC 2327) mandate that the proxy call state control functions (P-CSCF), the serving call state control functions (S-CSCFs) and the terminating end user (User Equipment UE) to examine the media contents of the session description protocol (SDP) text in the session initialization protocol (SIP) message.

Figure 1:
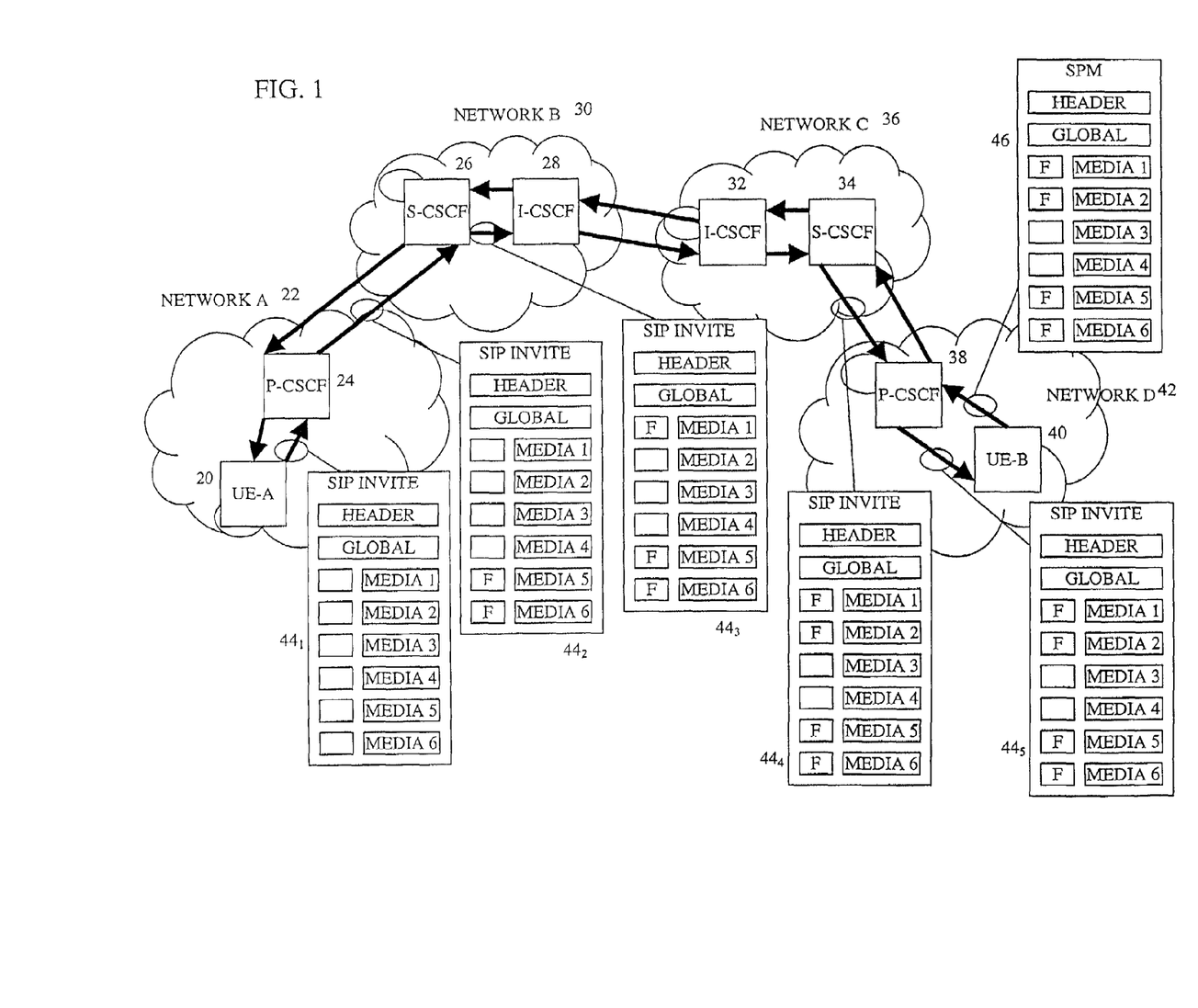
FIG. 1 is an example of an overall system diagram for media session initiation.

FIG. 1 shows a simplified session initiation system. A user, UE-A 20, desires to initiate a media session with another user UE-B 40. In FIG. 1, UE-A 20 is shown as "roaming" in network A 22, not its home network. UE-A 20 sends a SIP invite message $44_1$ to UE-B 40 via network A 22. The UE-A SIP invite $44_1$ indicates all the media types that it can support. As shown in FIG. 1, the SIP invite $44_1$ has a header, global information, and a list of the supported media types (media 1 to media 6). The supported media types include information for each media, such as the CODEC type, stream format, stream bit rate, and communication port number. Under the proposed system, there are no limits on the number of media types that a UE can include in the SIP invite message.

Figure 2:
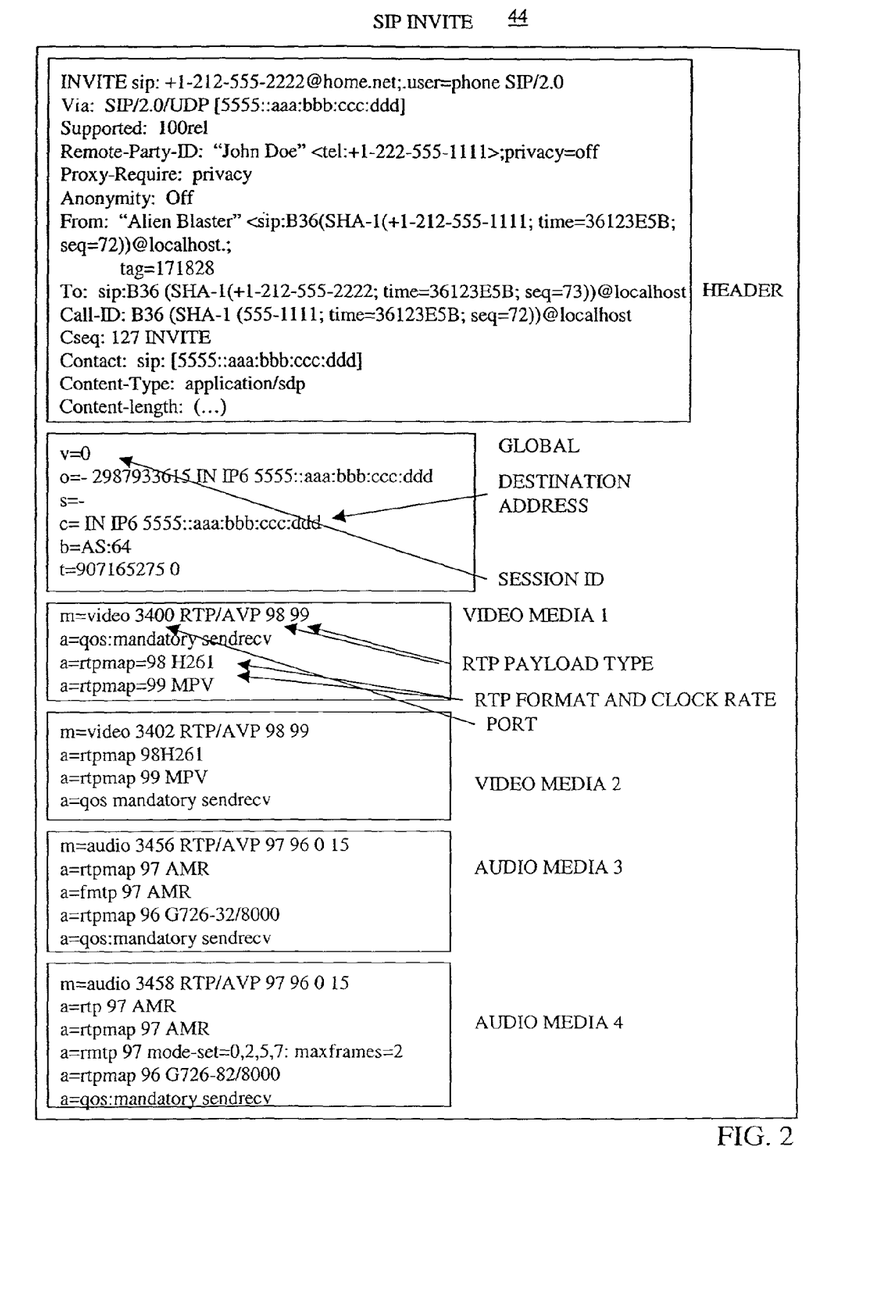
FIG. 2 is an example of a Session Initialization Protocol (SIP) message.

FIG. 2 is an example of a SIP invite message. The SIP invite message has a header, global information and supported media types for UE-A 20 for potential use in the proposed media session. The header includes various overhead information, such as the origin and destination of the SIP invite. The global information includes information common to all the proposed media types, such as the destination address and the proposed session identification (ID) number. The supported media types are listed. In this example, four media types are listed, two video (video media 1 and video media 2) and two audio (audio media 3 and audio media 4). Each proposed media session includes information regarding the media session, such as the port number, real time protocol (RTP) payload type and RTP format and clock rate port.

UE-A 20 sends the SIP invite to its current network, such as network A 22, in which it is currently located. UE-A may be "roaming," as shown in FIG. 1 and communicating with a network, network A 22, or it may be in its home network, network B 30. The SIP invite $44_1$ is examined by a P-CSCF 24 of its current network, such as network A 22, for routing to its destination, UE-B 40 via UE-A's home network, network B 30. The P-CSCF 24 examines the session description protocol (SDP) multimedia contents of the SIP invite $44_1$ for validation and authorization. If the P-CSCF's network, network A 24, does not support any part of the media information, (such as the CODESs, bit rate or the type), it flags that portion of the media information by setting the port number to "0" and leaving the other contents of the media information untouched, as shown for media 5 and 6 for SIP invite $44_2$.

Figure 3:
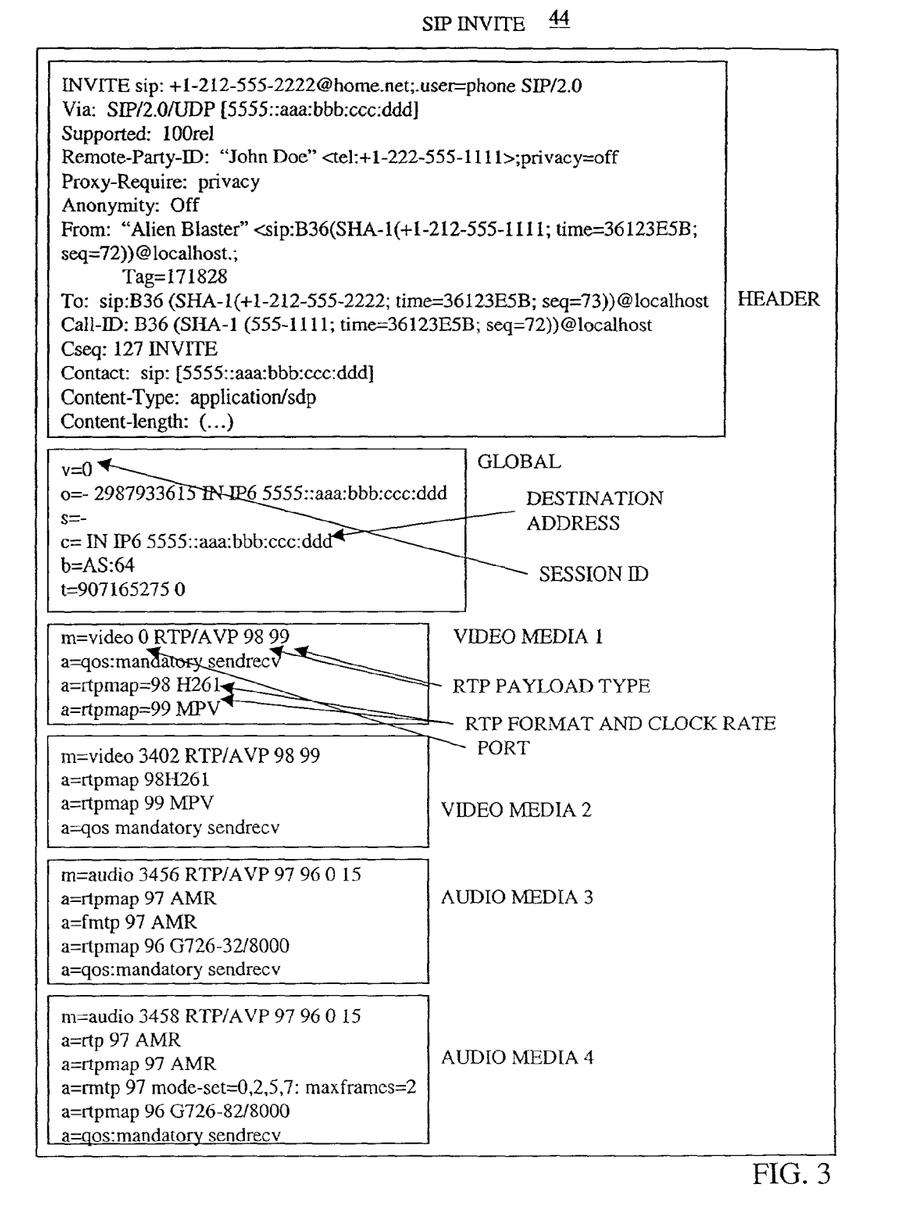
FIG. 3 is an example of a SIP message with a flagged media type.

FIG. 3 is an example of such a flagged SIP invite 44. To illustrate, the P-CSCF cannot support video media 1. As shown in FIG. 3, the port number is set to "0" so that UE-B 40 realized that video media 1 cannot be selected for the media session.

The network A P-CSCF 24 forwards the modified SIP invite $44_2$ to the network B S-CSCF 26 for further handling, routing and validation. If UE-A 20 is in the home network, both the P-CSCF and S-CSCF function are performed by the home network 30. The network B S-CSCF 26 examines the SIP invite $44_2$ including the media information. Media types not supported by UE-A's service license agreement (SLA) are flagged. If UE-A 20 is in its home network, the flagging process is only performed by the S-CSCF 26, not by the P-CSCF 24. The S-CSCF 26 forwards the SIP invite $44_3$ to UE-B's home network, network $C_{36}$, using intorgating-CSCFS (I-CSCF) 28, 32.

The network C S-CSCF 34 similarly examines the SIP invite $44_3$ for media types not available under UE-B's SLA. The not available media types are flagged, as illustrated for media 1 and of SIP $44_4$. If UE-B 40 is not in its home network, as shown, the SIP invite $44_4$ is forwarded to the P-CSCF 38 of the network, network D 42, where UE-B 40 is currently located, or "roaming." If UE-B 40 is in its home network, the SIP invite $44_4$ is forwarded to the P-CSCF 38 of the home network.

The P-CSCF 38 flags the media types not supported by the network, network D. No additional flagged media types are shown in SIP invite $44_5$. If the UE-B is in its home network, the flagging is only performed by the S-CSCF 34. The P-CSCF 38 sends the SIP invite $44_5$ to UE-B 40. UE-B 40 examines the media information of the SIP invite $44_5$ and determines whether it is capable of using any of the unflagged media types. If it can not use any of the unflagged media types or there are not any remaining unflagged media types, UE-B 40 sends UE-A 20 a session description protocol message (SPM) 46 with all media types flagged. If it can use the unflagged media types, UE-B 40 selects one or more of the available media types for the session. The selected media types unflagged and the flagged media types are returned to UE-A 20 in the SPM 44.

As shown in FIGS. 2 and 3, the SIP invite message 44 is large and, accordingly, consumes valuable air interface and wireless network resources. This resource consumption either degrades the network performance or reduces the maximum number of users serviced by the networks.

Accordingly, it is desirable to have alternate approaches for media session initiation.

SUMMARY

The present invention reduces the size of the SIP message by eliminating or deleting unsupported and/or unauthorized media types in the SIP along the signaling route from the originating end user to the terminating one and back. The present invention restricts the media information carried within the SIP message to information that is allowed by the network and authorized for the users at both ends.

DETAILED DESCRIPTION OF THE PREFERRED EMBODIMENT(S)

Figure 4A:
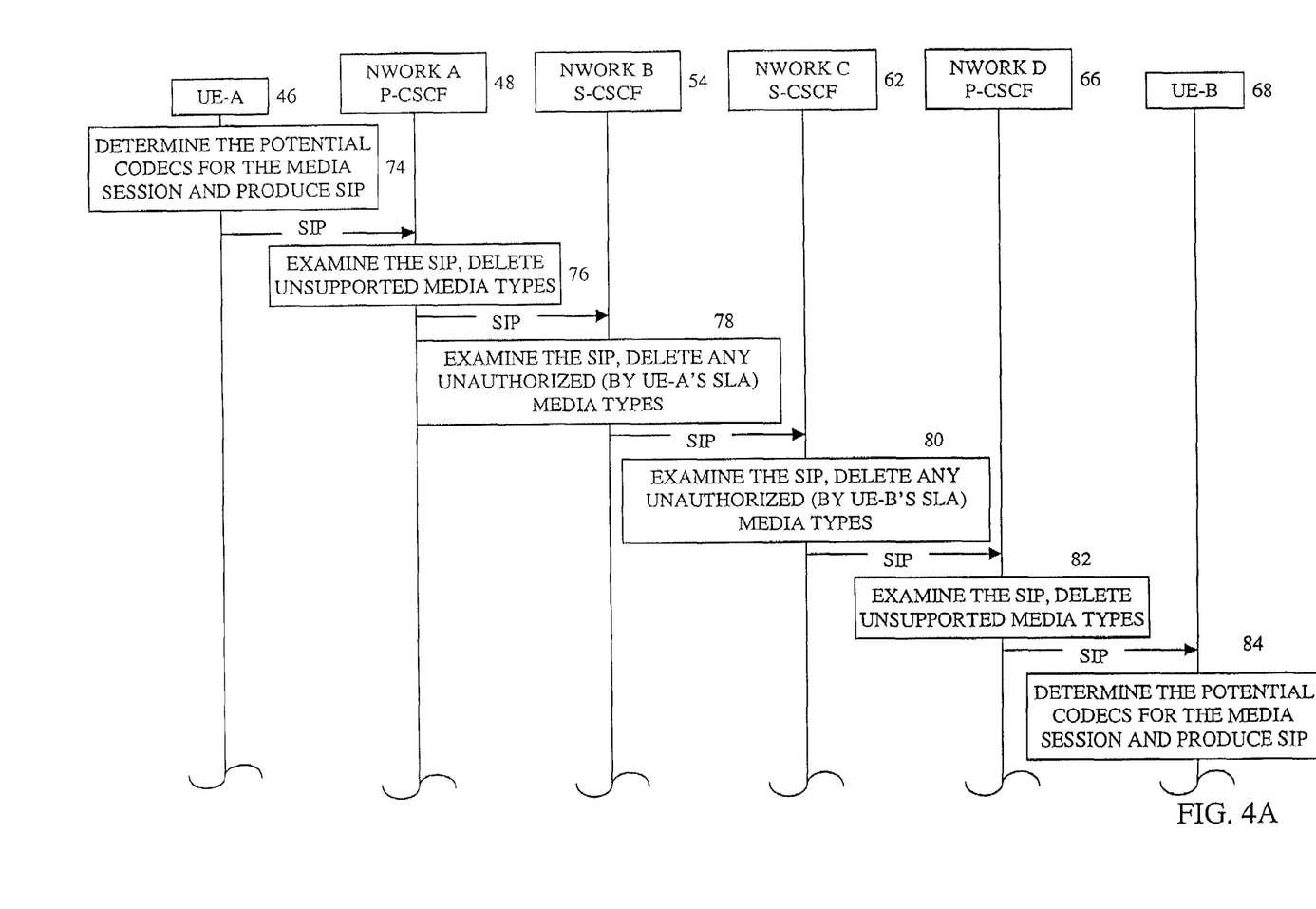
FIGS. 4a and 4b are signaling diagrams.
Figure 4B:
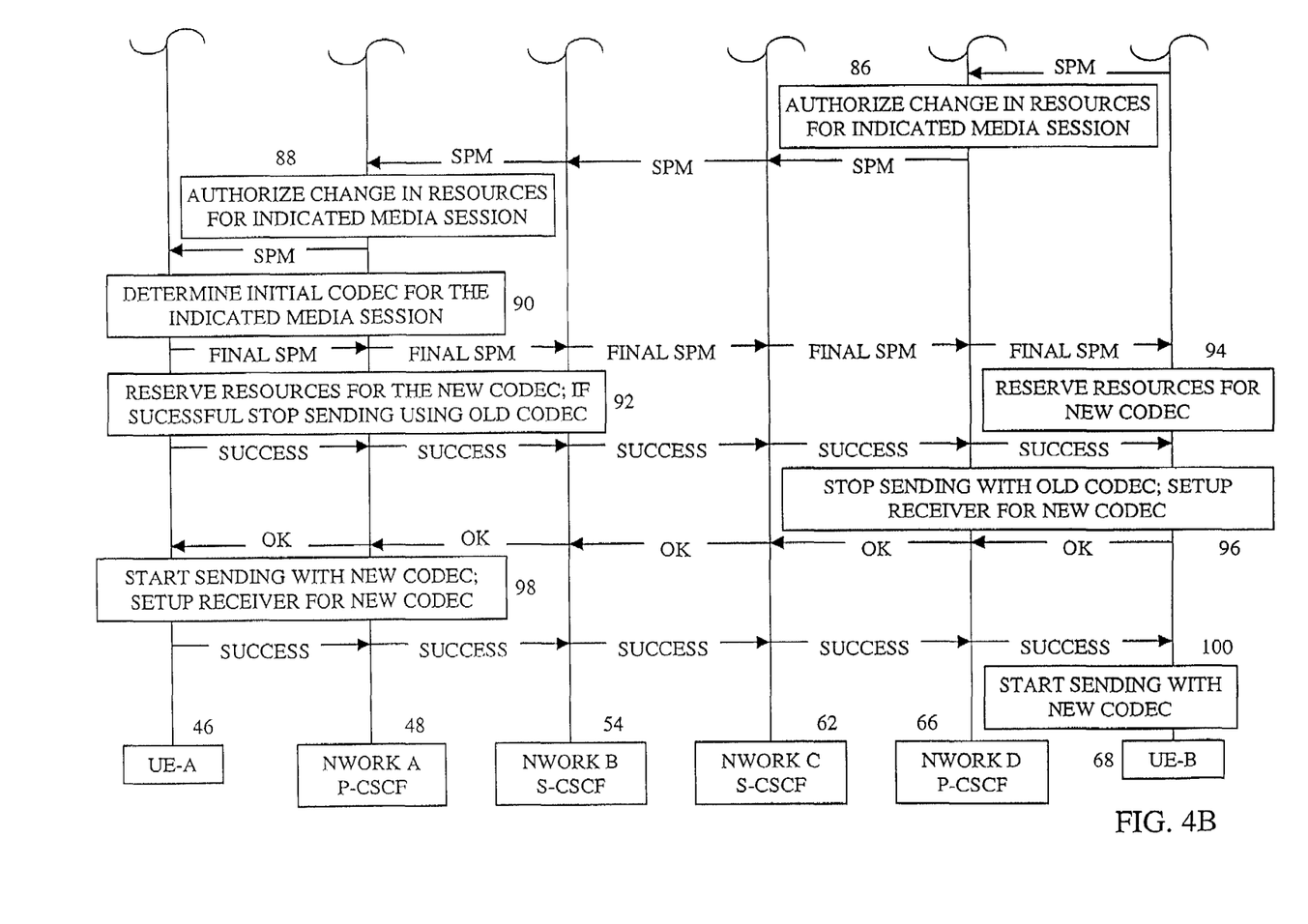
Figure 5:
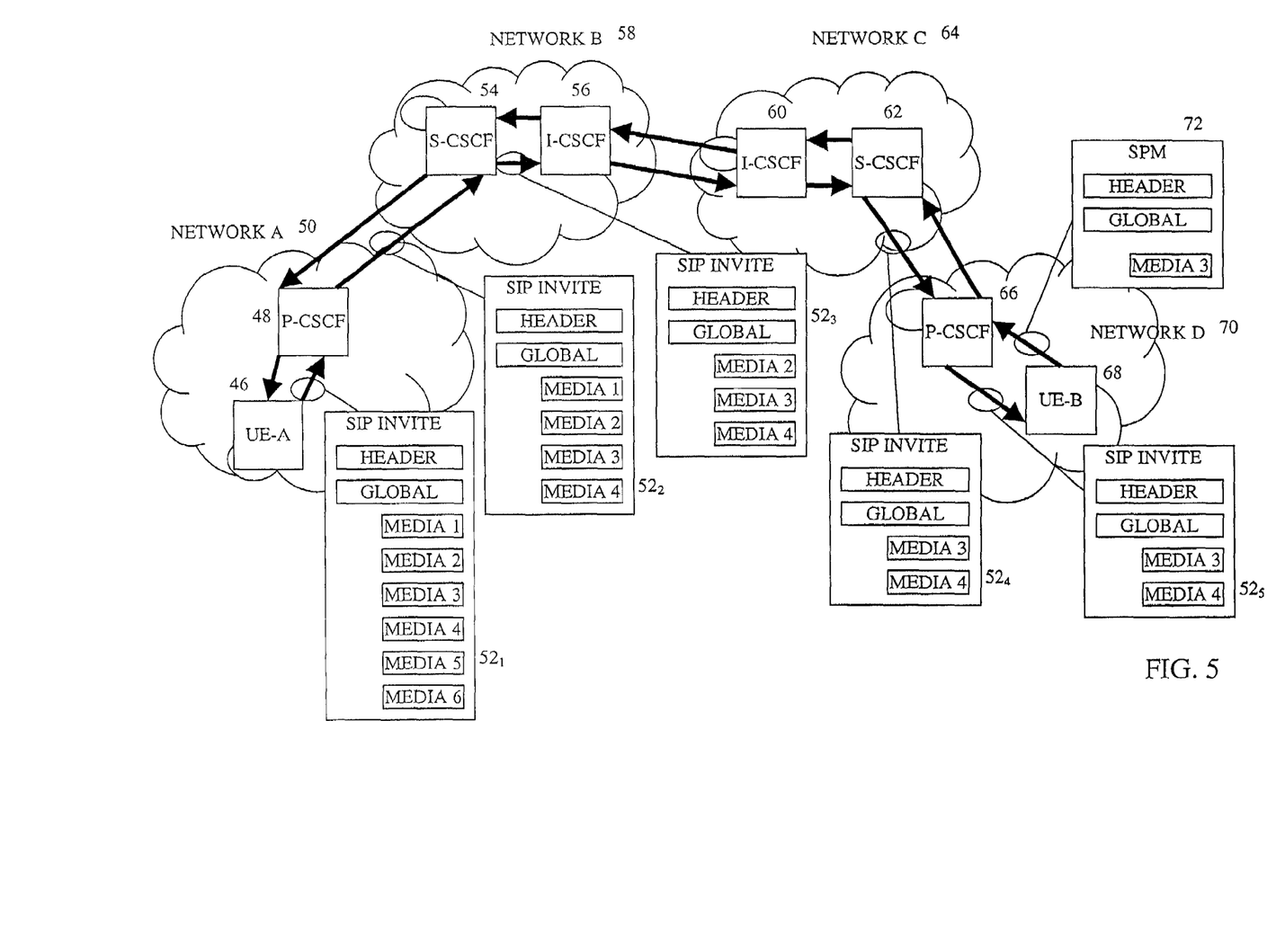
FIG. 5 is an example of an overall system diagram.

FIGS. 4a and 4b is a signaling diagram of the present invention. FIG. 5 illustrates an example of the components of the media session initiation. UE-A 46 desires to initiate a media session with UE-B 68. UE-A 46 and UE-B 48 may be any wireless communication device, such as a mobile phone, personal computer (PC) or personal digital assistant (PDA). UE-A 46 in the system of FIG. 5 is shown as "roaming" in network A 50. For FIG. 1, network B 58 is the "home" network for UE-A 46. Alternately, UE-A 46 may be in its home network.

UE-A 46 determines the CODECS available for the media types for the proposed session, (74). A SIP invite $52_1$, such as shown in FIG. 2, is composed using this information. UE-A 46 sends the SIP invite message $52_1$ intended for UE-B 58 via network A is P-CSCF 48. UE-B 68 is shown as "roaming" in network D 70. Alternately, UE-B 68 may be in its home network, network C 64. The SIP invite $52_1$ includes all the media types that UE-A 46 can support and invites UE-B 68 to choose the type(s) that it can support. The media information includes the CODEC types, stream format, stream bit rate, and communication port number, among other media attributes. Under the current proposed system, there are no limits on the number of media types that a UE can include in the SIP invite message $52_1$. Furthermore, there are no restrictions on the end user, such as UE-B 68 to include unauthorized unsupported media types.

The P-CSCF 48, incorporated in network A, routes the SIP invite $52_1$ to the end user (UE-B 68). The P-CSCF function 48 initiates examination of the SIP invite message $52_1$ for routing and for validation and authorization of the SDP multimedia contents. If network A 50 does not support any part of the media information (such as the CODECS, the bit rate or the media type), P-CSCF 48 deletes the media entry from the SDP message leaving only the supported media entries, (76), as shown as SIP invite $52_2$. In the example SIP invite $52_2$, media types 5 and 6 have been deleted, since it is not supported by network A 50. Deleting the media type is performed by removing all of the information of the unsupported media type.

Figure 6:
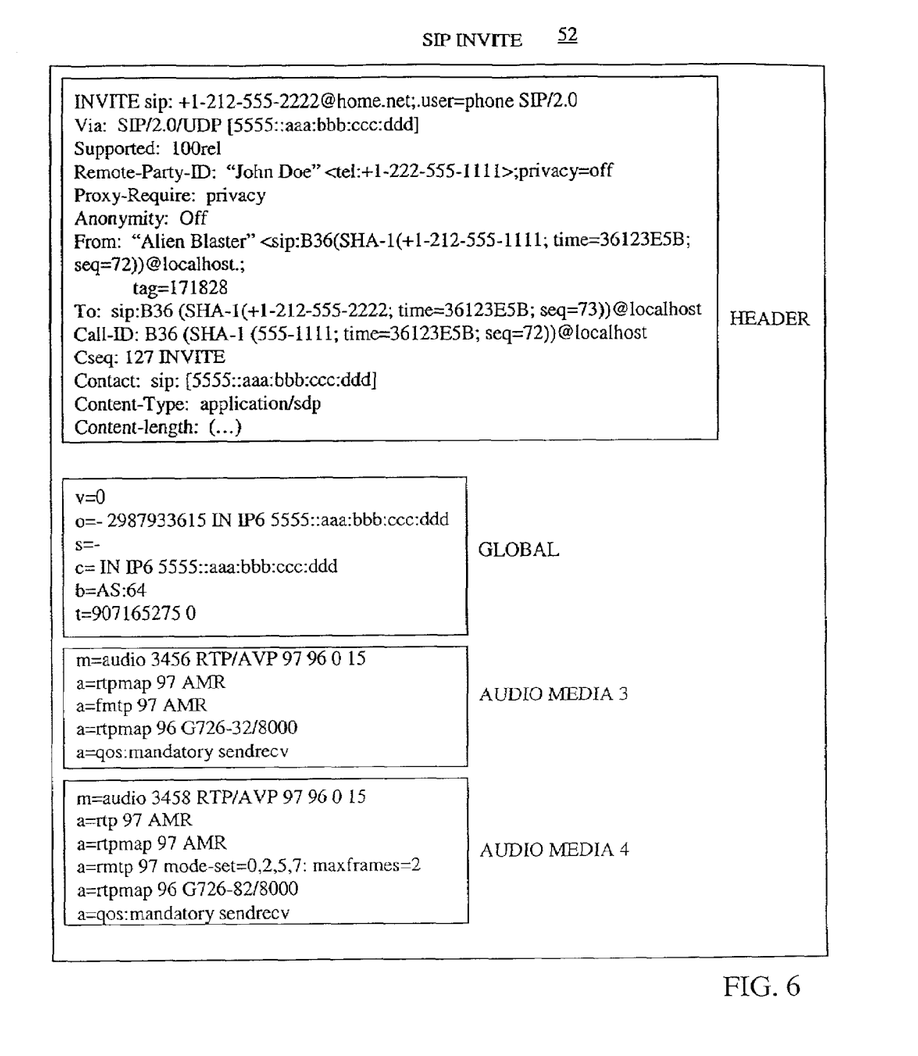
FIG. 6 is an example of a SIP message.

FIG. 6 is an example of the SIP invite message 44 of FIG. 2 with the media types deleted, as shown as SIP invite 52. To illustrate, network A 50 does not support video media types, (video media 1 and 2). As shown in FIG. 6, the information concerning video media 1 and 2 is deleted, leaving only audio media 3 and 4. The P-CSCF 48 then forwards the modified SIP invite $52_2$ to the S-CSCF 54 of network B 58 for further handling (routing and validation). The S-CSCF 54 of network B 58 examines the SIP invite $52_2$ including the modified SDP message. The S-CSCF 54 will remove unauthorized media types that UE-A 46 is not permitted to use under its SLA, (78). The S-CSCF 54 (which usually exists in the UE home network) also removes any not permitted media contents. In the FIG. 5 example, media type 1 is deleted, as shown for SIP invite $52_3$. If UE-A 46 is in its home network, typically both the P-CSCF and S-CSCF function 46, 54 are performed by the home network, with only the S-CSCF 54 deleting media types.

The S-CSCF 54 forwards the further modified SIP invite $52_3$ to UE-B's home network, network C 64, through its I-CSCF 56 (Intorgating-CSCF). After receiving the SIP invite $52_3$ via its I-CSCF 60, the S-CSCF 62 of network C 64 removes media types not permitted under UE-B's SLA, (80). After forwarding the SIP invite $52_4$ to UE-B's current network D 70, P-CSCF 66 removes unsupported media types of the current network, where UE-B is roaming, (82). As shown in FIG. 5, no additional media types are deleted in SIP invite $52_5$. If UE-B 68 is in its home network, typically the S-CSCF and P-CSCF functions 62, 66 are performed by the home network, with the S-CSCF 62 deleting the media types.

UE-B 68 examines the remaining SDP media types of the SIP invite $52_5$ and determines if it can support them. If it can, it selects one or more of the remaining media types and sends UE-A 48, a session progress message 72, (84), through the network D P-CSCF 66. If it can not support any of the media types or none remain in the SDP information, UE-B 68 also sends a session progress message with all the media types deleted.

Figure 7:
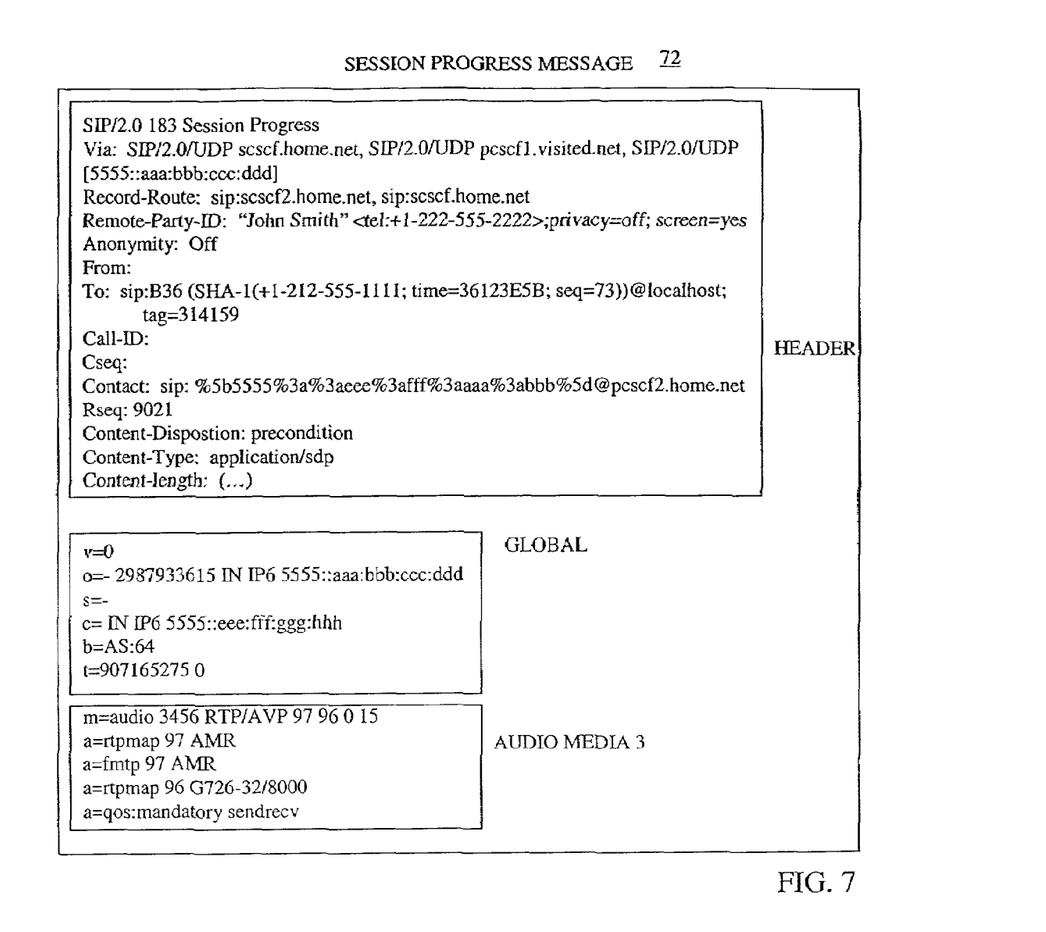
FIG. 7 is an example of a SIP message with removed media information.

FIG. 7 is an example of a SPM 72. To illustrate a possible derivation for SPM 72, UE-B 68 receives the SIP invite 52 of FIG. 6. UE-B 68 is capable of supporting audio media 3. A SPM 72 is generated at UE-B 68 only containing the selected media type, audio media 3, and a header and global information. Audio media type 4 is not included.

Upon reception of the SPM 72, the P-CSCF 66 authorizes network D 70 to allocated the resources for the sessions indicated by the media type information, (86). The SPM progresses to UE-A 46 through the network C S-CSCF 62, the network B S-CSCF 54 and the network A P-CSCF 48. The network A P-CSCF 48 authorizes network A 50 to allocate the resources for the indicated session(s), (88). After the P-CSCF 48 sends the SPM 72 to UE-A 46, UE-A 46 determines the initial CODEC(S) to use for the media session(s) of the SPM 72, (90).

UE-A 46 sends a final SPM to UE-B 68, through the same path, indicating the selected CODEC(S). At the same time as sending the final message, UE-A reserves the resources for the selected CODEC, (92), and, if successful, sends a success message to UE-B 68. After UE-B receives the final SPM, it reserves resources for the selected CODEC, (94).

When UE-B 68 receives the success message, it stops sending messages with its old CODEC, sets up the receiver for the new CODEC and sends an O.K. message to UE-A, (98). After UE-A 98 receives the O.K. message, it sends a success message with the new CODEC and sets up the receiver for the new CODEC, (98). After UE-B 68 receives the success message, it starts sending data with the new CODEC, (100).

What is claimed is:

1. Method for making efficient use of air link resources and network capacity in a mobile telecommunication system having at least one network supporting communications between two user equipments (UEs), said method comprising the steps of:
   (a) a first one of said two UEs generating a session initialization protocol (SIP) message to a second one said two UEs setting forth various media types and requesting which of the media types set forth said second UE can accommodate;
   (b) said first UE transmitting the SIP message created at step (a) to a network device having a proxy call state control function of said network to examine the media contents of the SIP message;
(c) said network modifying the SIP message from said first UE by deleting from said message any media not supported by said network; and
(d) transmitting the modified SIP message to said second one of said UEs.

2. The method of claim 1 wherein step (c) further comprises:
modifying said message by deleting media from said message which the first UE is not entitled to utilize.

3. The method of claim 1 further comprising:
(e) said second UE determining media types said second UE will accommodate;
(f) modifying the message received at step (d) from said first UE by eliminating any media which said second UE will not accommodate and which are not supported by said second UE;
(g) said second UE transmitting a session progress message to said network setting forth only media types in the message modified in step (f) which are supported by the second UE; and
(h) said network transmitting the session progress message received at step (g) to said first UE.

4. The method of claim 3 wherein step (h) further comprises:
(i) authorizing network resources using a session requested by the session progress message.

5. The method of claim 4, further comprising:
(j) said first UE determining media types of the session progress message;
(k) said first UE transmitting a final session progress message to the second UE through said network; and
(l) said second UE reserving resources responsive to receipt of the final session progress message.

6. The method of claim 5, further comprising:
(m) said first UE reserving resources for a session and reporting availability of the resources to the second UE using a success message; and
(n) the second UE, responsive to receipt of the message transmitted, transmitting an OK message to the first UE using a different CODEC.

7. The method of claim 6, further comprising;
(o) said first UE, responsive to the OK message, sending a second success message to the second UE and setting up to receive the different CODEC; and
(p) said second UE sending using a new CODEC to the first UE responsive to the acknowledge received at step (o).

8. A method for making efficient use of air link resources and network capacity in a mobile telecommunication system having a plurality of networks supporting communications between first and second user equipments (UEs), said method comprising the steps of:
(a) said first UE generating a session initialization protocol (SIP) message requesting media types which said second UE can accommodate;
(b) said first UE transmitting the SIP message to a network device having a proxy call state control function of a first one of said networks to examine the media contents of the SIP message;
(c) said first network modifying the SIP message by deleting from the SIP message any media not supported by said first network; and
(d) said first network transmitting the modified message to said second UE through a second one of said networks.

9. The method of claim 8 wherein step (c) further comprises:
said first network modifying said message by deleting media from said message which said first UE is not entitled to utilize.

10. The method of claim 8 further comprising:
(e) said second UE, responsive to receipt of the modified message transmitted at step (d), determining the media types in the modified message said second UE will accommodate; and
(f) said second UE transmitting a session progress message with only the determined media types.

11. A method for making efficient use of air link resources and network capacity in a mobile telecommunication system having a plurality of networks supporting communications between first and second user equipments (UEs), said method comprising the steps of:
(a) said first UE generating a session initialization protocol (SIP) message requesting media type which said second UE can accommodate;
(b) said first UE transmitting the SIP message created at step (a) to a network device having a proxy call state control function of a first one of said networks to examine the media contents of the SIP message;
(c) said first network modifying the message by deleting from said message any media type not supported by said first network;
(d) said first network transmitting the modified message to a second one of said networks; and
(e) said second one of said networks, responsive to receipt of the modified message transmitted at step (d), deleting from said modified message any media type not supported by said second network and transmitting the further modified message to said second UE through a third one of said networks.

12. The method of claim 11 wherein step (c) further comprises:
said second network modifying said message by deleting media from said message which said first UE is not entitled to utilize.

13. The method of claim 11 further comprising:
(f) said third network modifying the message received at step (e), by eliminating any media not permitted for said third network and sending the modified message to the second UE;
(g) said second UE determining the media types in the modified message said second UE will accommodate;
(h) said second UE transmitting a session progress message having only the determined media types to said third network; and
(i) said third network transmitting said session progress message to said first UE through said first and second networks.

14. The method of claim 11 wherein said first UE is a UE assigned to said second network and transmitting at step (b) while roaming in said first network.

15. The method of claim 11 wherein said second UE is a UE assigned to said second network and transmitting at step (b) while roaming in said third network.

16. The method of claim 15 wherein step (e) further comprises:
said second network, as a home network for said second UE modifying the message by deleting any media types which the second UE is not authorized to use.

17. The method of claim 14 wherein step (e) further comprises:
  said second network, as a home network for said first UE modifying the message by deleting any media types which the first UE is not authorized to use.

18. A mobile communication system making efficient use of air link resources and network capacity, comprising:
  at least one network supporting communications between a first and second user equipments (UEs) in said network; wherein:
  said first UE generating a session initialization protocol (SIP) message requesting media types which said second UE can accommodate and transmitting the SIP message created by said first UE to said network;
  said network modifying said message from said first UE by deleting media types not supported by said network; and
  said network transmitting the modified message to said second UE.

19. A mobile communication system making efficient use of air link resources and network capacity comprising:
  a plurality of networks supporting communications between a first and second user equipments (UEs) in said networks, wherein:
  said first UE generates a session initialization protocol (SIP) message requesting media types which said second UE can accommodate;
  said first UE transmits the SIP message to a first one of said networks; and
  said first network having-an SIP message modifying device for modifying the SIP message received from said first UE by deleting from the SIP message media types not supported by said first network and a transmitter for transmitting the modified message to said second UE through a second one of said networks.

20. A mobile communication system making efficient use of air link resources and network capacity, comprising:
  a plurality of networks supporting communications between a first and second user equipments (UEs) in said network;
  said first UE having an SIP message generator for generating a session initialization protocol (SIP) message requesting media types which said second UE can accommodate;
  said first UE further including a transmitter for transmitting the SIP message, created by said SIP message generator, to a first one of said networks; and
  said first network having an SIP message modifier for modifying the SIP message received from said first UE by deleting from the SIP message media types which said second UE is not authorized to use and including a transmitter for transmitting the modified SIP message to the second UE through a second one of said networks.

* * * * *

UNITED STATES PATENT AND TRADEMARK OFFICE
CERTIFICATE OF CORRECTION

PATENT NO. : 7,218,626 B2  
APPLICATION NO. : 10/022998  
DATED : May 15, 2007  
INVENTOR(S) : Shaheen et al.

It is certified that error appears in the above-identified patent and that said Letters Patent is hereby corrected as shown below:

At column 1, line 66, after the words "as the", delete "CODESs" and insert therefor --CODECs--.

At column 2, lines 19 & 20, after the word "using", delete "intorgating-CSCFS" and insert therefor --interrogating-CSCFs--.

At column 3, line 14, after "4a and 4b", delete "is a signaling diagram", and insert therefor --are signaling diagrams--.

At column 3, line 21, after "FIG", delete "1" and insert therefor --5--.

At column 4, line 6, before the word "After", delete "(Intorgating-CSCF)." and insert therefor --(Interrogating-CSCF).--.

At column 4, line 32, before the words "the resources", delete "allocated" and insert therefor --allocate--.

At claim 1, column 4, line 62, after the word "one", insert --of--.

At claim 7, column 5, line 49, before the word "received", delete "acknowledge" and insert therefor --acknowledgement--.

At claim 19, column 8, line 1, after the word "network", delete "having-an" and insert therefor -- having an--.

Signed and Sealed this

Twentieth Day of November, 2007

JON W. DUDAS  
*Director of the United States Patent and Trademark Office*